United States Patent
Sasser

(10) Patent No.: US 8,686,301 B2
(45) Date of Patent: Apr. 1, 2014

(54) SYSTEM TO DETERMINE IF VEHICLE CORRECTLY POSITIONED DURING WEIGHTING, SCALE TICKET DATA SYSTEM AND METHODS FOR USING SAME

(75) Inventor: Calvin S. Sasser, Hallsboro, NC (US)

(73) Assignee: International Paper Company, Memphis, TN (US)

( * ) Notice: Subject to any disclaimer, the term of this patent is extended or adjusted under 35 U.S.C. 154(b) by 377 days.

(21) Appl. No.: 13/183,719

(22) Filed: Jul. 15, 2011

(65) Prior Publication Data

US 2013/0015002 A1    Jan. 17, 2013

(51) Int. Cl.
  *G01G 19/02*    (2006.01)
  *G01G 9/00*    (2006.01)

(52) U.S. Cl.
  USPC .............................. 177/1; 177/132; 702/173

(58) Field of Classification Search
  USPC .................. 177/1, 132–135; 702/173–175
  See application file for complete search history.

(56) References Cited

U.S. PATENT DOCUMENTS

| | | |
|---|---|---|
| 2,083,783 A | 6/1937 | Haegele |
| 2,723,844 A | 11/1955 | Thurston |
| 2,746,738 A | 5/1956 | Reiser |
| 3,512,004 A | 5/1970 | Papin et al. |
| 3,842,922 A | 10/1974 | Fain et al. |
| 4,134,464 A | 1/1979 | Johnson et al. |
| 4,192,394 A | 3/1980 | Simpson |
| 4,465,151 A | 8/1984 | Gorman et al. |
| 4,535,858 A | 8/1985 | Provost et al. |
| 4,605,081 A | 8/1986 | Helmly, Jr. et al. |
| 4,969,112 A | 11/1990 | Castle |
| 5,058,691 A | 10/1991 | Sela |
| 5,083,200 A * | 1/1992 | Deffontaines ............... 348/148 |
| 5,617,086 A | 4/1997 | Klashinsky et al. |
| 5,621,195 A | 4/1997 | Taylor et al. |
| 5,629,509 A | 5/1997 | Uebel |
| 5,821,879 A | 10/1998 | Liepmann |
| 6,085,979 A | 7/2000 | Maddox |
| 6,459,050 B1 | 10/2002 | Muhs et al. |
| 7,136,828 B1 | 11/2006 | Allen et al. |
| 7,432,456 B2 | 10/2008 | LaFollette et al. |
| 7,668,692 B2 | 2/2010 | Tatom et al. |
| 7,684,946 B2 | 3/2010 | Susor |
| 7,783,450 B2 | 8/2010 | Hively et al. |
| 7,855,662 B2 | 12/2010 | Yano |
| 2006/0111868 A1* | 5/2006 | Beshears et al. ............... 702/173 |

FOREIGN PATENT DOCUMENTS

| | | |
|---|---|---|
| EP | 0259523 | 9/1986 |
| WO | 2008018826 | 2/2008 |

* cited by examiner

*Primary Examiner* — Randy W Gibson
(74) *Attorney, Agent, or Firm* — Thomas W. Barnes, III; Eric W. Guttag

(57) ABSTRACT

A vehicle weighing system for counting the number of vehicle axles before and after weighing of an unloaded vehicle to determine if the unloaded vehicle is correctly positioned during weighing, as well as method for generating a scale ticket to record vehicle axle count data from the vehicle weighing system. Also, a scale ticket data system with a plurality of such scale tickets and a scale ticket electronic database which collects the scale tickets and identifies those scale tickets corresponding to unloaded and weighed vehicles which are correctly or incorrectly positioned during weighing, as well as a method for querying the scale ticket electronic database to identify those scale tickets corresponding to unloaded and weighed vehicles which are correctly or incorrectly positioned during weighing.

21 Claims, 9 Drawing Sheets

US 8,686,301 B2

SYSTEM TO DETERMINE IF VEHICLE CORRECTLY POSITIONED DURING WEIGHTING, SCALE TICKET DATA SYSTEM AND METHODS FOR USING SAME

FIELD OF THE INVENTION

The present invention broadly relates to a vehicle weighing system for counting the number of vehicle axles before and after weighing of an unloaded vehicle to determine if the unloaded vehicle is correctly positioned during weighing, as well as method for generating a scale ticket to record vehicle axle count data from the vehicle weighing system. The present invention also broadly relates to a scale ticket data system which comprises a plurality of such scale tickets and a scale ticket electronic database which collects the scale tickets and identifies those scale tickets corresponding to unloaded and weighed vehicles which are correctly (or incorrectly) positioned during weighing, as well as a method for querying the scale ticket electronic database to identify those scale tickets corresponding to unloaded and weighed vehicles which are correctly (or incorrectly) positioned during weighing.

BACKGROUND

In many transportation operations, payment is determined by the weight of the load carried by the vehicle, e.g., truck. For example, in the buying and selling of bulk grain, the sales or purchase price is usually determined by calculating the net weight of the grain carried by the vehicle. Similarly, household moving companies usually calculate their moving charges based upon the net weight of the load carried by the moving van.

In these transportation operations, the net weight of the load may be determined by weighing the vehicle twice. First, the vehicle may be weighed in the unloaded or empty state to obtain unloaded or tare weight. Second, after loading, the vehicle may be weighed again to obtain the loaded or gross weight of the vehicle. The net weight of the load may then be readily calculated by subtracting the tare weight from the gross weight of the vehicle. The particular order in which the vehicle is weighed to obtain the tare weight and gross weight is also usually not critical. For example, the vehicle may be weighed to measure and obtain the loaded or gross weight of the vehicle first, followed by measuring and obtaining the unloaded or tare weight of the vehicle, before calculating, for example, the net weight of the loaded vehicle.

During the weighing operation, the operator of the vehicle being weighed may inadvertently or even purposefully position the vehicle improperly within the weighing area (e.g., weighing platform) of the weigh scale such as a platform scale, pit scale, etc. For example, one or more of the wheels, usually either on the front most axle or rear most axle of the vehicle, may be located off of or outside of the weighing area of the scale, meaning that the vehicle is not correctly positioned for an actual or true weighing of the vehicle. With the vehicle being incorrectly positioned, the weight registered by the scale normally would be lighter than the actual or true weight of the vehicle, be it loaded or unloaded, causing a reading known as "lightweighting." If such incorrect positioning and weighing occurs when the unloaded or tare weight of the vehicle is being determined, such "lightweighting" will result in a net weight of the load which is determined to be inaccurately high, and thus the operator of the vehicle, if paid on a net weight of load basis, will be paid more than the load is actually worth.

SUMMARY

According to a first broad aspect of the present invention, there is provided in a system comprising:
  a vehicle weighing scale having a vehicle weighing area for weighing an unloaded vehicle having a plurality of vehicle axles, wherein the vehicle weighing area has a vehicle entry edge and a vehicle exit edge;
  a first vehicle axle counter unit which is activated to count the number of vehicle axles which pass completely over the vehicle entry edge before weighing of the unloaded vehicle; and
  a second vehicle axle counter unit which is activated to count the number of vehicle axles which pass completely over the vehicle exit edge after weighing of the unloaded vehicle;
  wherein the number of vehicle axles counted by the first and second counter units are recorded by a scale ticket such that: (i) when the number of vehicle axles counted by the first and second counter units are same, the unloaded vehicle is correctly positioned in the vehicle weighing area; and (ii) when the number of vehicle axles counted by the first and second counter units is different, the unloaded vehicle is incorrectly positioned in the vehicle weighing area.

According to a second broad aspect of the present invention, there is provided a method comprising the following steps:
  a. providing a vehicle weighing scale having:
    a vehicle weighing area for weighing an unloaded vehicle having a plurality of vehicle axles, wherein the vehicle weighing area has a vehicle entry edge and a vehicle exit edge;
    a first vehicle axle counter unit which is positioned to count the number of vehicle axles which pass completely over the vehicle entry edge; and
    a second vehicle axle counter unit which is positioned to count the number of vehicle axles which pass completely over the vehicle exit edge; and
  b. activating the first vehicle axle counter unit to count the number of vehicle axles which pass completely over the vehicle entry edge before weighing of the unloaded vehicle;
  c. activating the second vehicle axle counter unit to count the number of vehicle axles which pass completely over the vehicle entry edge after weighing of the unloaded vehicle; and
  d. generating a scale ticket which records the number of vehicle axles counted by the first and second counter units in the vehicle weighing system such that: (i) when the number of vehicle axles counted by the first and second counter units are same, the unloaded vehicle is correctly positioned in the vehicle weighing area; and (ii) when the number of vehicle axles counted by the first and second counter units is different, the unloaded vehicle is incorrectly positioned in the vehicle weighing area.

According to a third broad aspect of the present invention, there is provided a system comprising:
  a plurality of scale tickets, each scale ticket comprising vehicle axle count data for an unloaded and weighed vehicle, wherein the vehicle axle count data contains:

a first number of vehicle axles counted before weighing of the unloaded vehicle which pass completely over a vehicle entry edge of a weighing vehicle area; and a second number of vehicle axles counted after weighing of the unloaded vehicle which pass completely over a vehicle exit edge of the vehicle weighing area; and a scale ticket electronic database which contains the plurality of the scale tickets and which identifies:

those scale tickets corresponding to an unloaded and weighed vehicle which is correctly positioned in the vehicle weighing area wherein the first and second numbers are the same; and those scale tickets corresponding to an unloaded and weighed vehicle which is incorrectly positioned in the vehicle weighing area wherein the first and second numbers are different.

According to a fourth broad aspect of the present invention, there is provided a method comprising the following steps:

a. providing a scale ticket electronic database comprising a plurality of scale tickets, each scale ticket comprising vehicle axle count data for an unloaded and weighed vehicle, wherein the vehicle axle count data contains:

a first number of vehicle axles counted before weighing of the unloaded vehicle which pass completely over a vehicle entry edge of a weighing vehicle area; and a second number of vehicle axles counted after weighing of the unloaded vehicle which pass completely over a vehicle exit edge of the vehicle weighing area; and b. querying the scale ticket electronic database to identify:

those scale tickets corresponding to an unloaded and weighed vehicle which is correctly positioned in the vehicle weighing area wherein the first and second numbers are the same; and/or those scale tickets corresponding to an unloaded and weighed vehicle which is incorrectly positioned in the vehicle weighing area wherein the first and second numbers are different.

BRIEF DESCRIPTION OF THE DRAWINGS

The invention will be described in conjunction with the accompanying drawings, in which.

DETAILED DESCRIPTION

Figure 1:
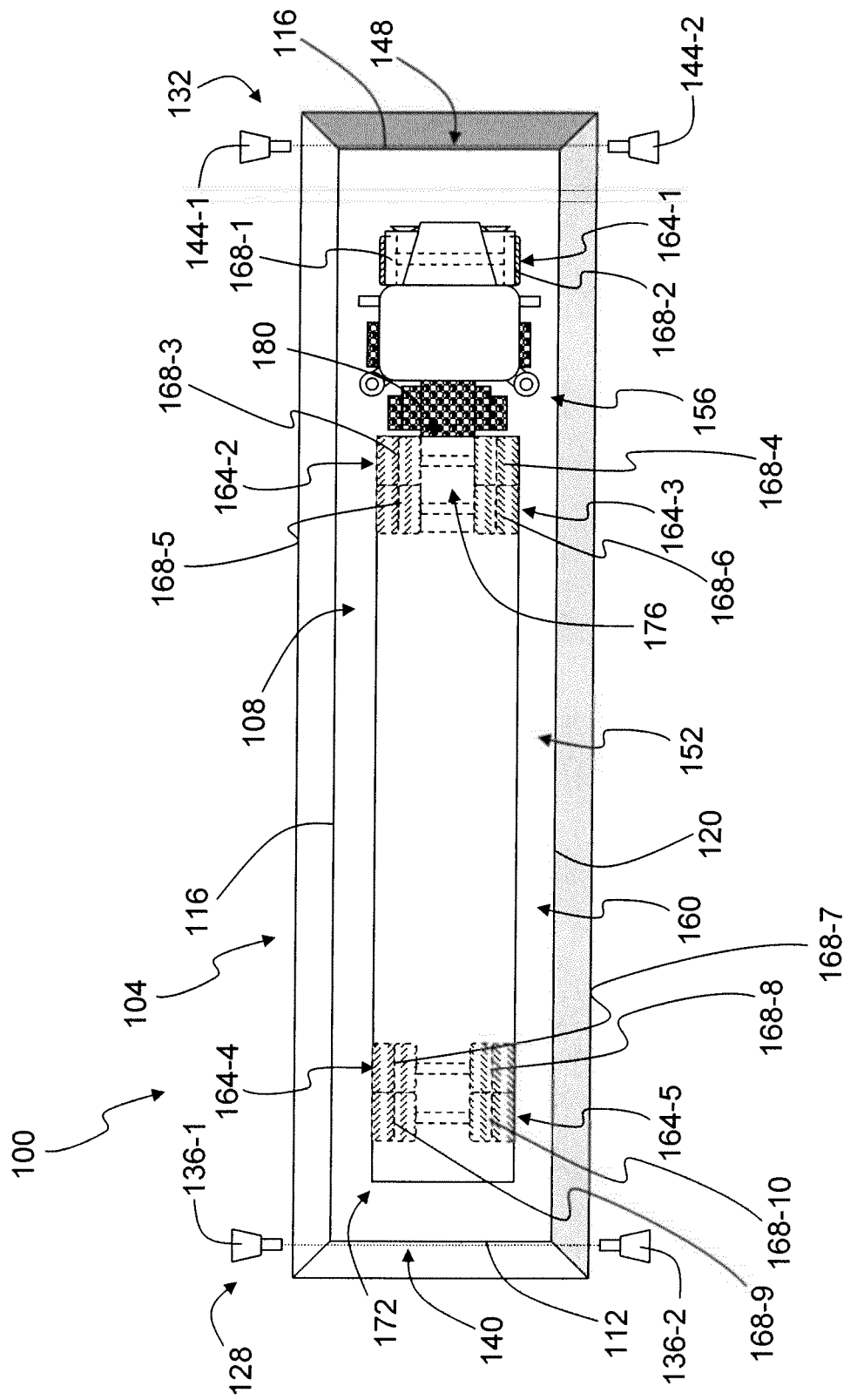
FIG. 1 is a top plan view of an embodiment of a vehicle weighing system which counts vehicle axles before and after weighing of the vehicle on a vehicle weighing scale, wherein the vehicle is in the form of a truck comprising the combination of a tractor and trailer and showing the truck completely within the vehicle weighing area of the scale.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "upper," "lower," "side," "front," "frontal," "forward," "rear," "rearward," "back," "trailing," "above," "below," "left," "right," "horizontal," "vertical," "upward," "downward," etc., are merely used for convenience in describing the various embodiments of the present invention. For example, the orientation of the embodiments shown in FIGS. 1-6 may be reversed or flipped over, rotated by 90° in any direction, etc.

For the purposes of the present invention, the term "vehicle" refers to device which is used to transport a load on or over land and which has a plurality of axles. Vehicles may include trucks (e.g., trucks with trailers, dump trucks, cement or concrete trucks, etc.), vans (e.g., moving vans, other cargo carrying vans, etc.), etc.

For the purposes of the present invention, the term "load" refers to cargo, freight, goods, materials, merchandise, commodities, etc., which are added to, dumped in, carried by, transported by, etc., a vehicle, and which may be in solid, fluid, or liquid form. For example, a load may include one or more of: wood materials such as logs, wood pieces (e.g., wood planks, wood chips, bark, etc), wood pulp, wood fibers, etc.; furniture; other solid commodities such as grain (e.g., wheat, corn, oats, etc.), sugar, salt, coffee, coal, metal ore (e.g., iron ore, etc.), aggregate such as sand, gravel, stone, slag, or recycled crushed concrete, etc.; liquids such as oil, gasoline, diesel fuel, chemicals, water, etc.; fluid materials such as cement or concrete; etc.

For the purposes of the present invention, the term "tare weight" (also known as "unladen weight") refers to the weight or mass of a vehicle in an unloaded condition, i.e., without a load, empty, etc.

For the purposes of the present invention, the term "gross weight" (also known as "laden weight") refers to the weight or mass of a vehicle in a loaded condition, i.e., with a load, filled, etc.

For the purposes of the present invention, the term "net weight" refers to the gross weight minus the tare weight, i.e., the load weight. The order of measuring and obtaining the gross weight and tare weight for the vehicle to calculate the net weight is usually not critical. For example, the gross weight may be measured and obtained first, followed by measuring and obtaining the tare weight, and vice versa.

For the purposes of the present invention, the term "truck" refers to a motorized vehicle which is used to carry, transport etc., a load on or over land and which has a unit, section, compartment, etc., for carrying, transporting, etc., the load. The motorized and load carrying units, sections, compartments, etc., of the truck may be unitary (e.g., such as a dump truck) or may comprise the combination of separable motorized and load carrying transporting, etc., units, sections, etc., (e.g., such as a tractor and trailer unit combination).

For the purposes of the present invention, the term "tractor" refers to the motorized (power) unit, section, etc., of a truck.

For the purposes of the present invention, the term "trailer" refers to the unmotorized unit, section, etc., of a truck which is used to carry transport etc., a load. The term "trailer" includes the term "semi-trailer," i.e., a trailer without a front axle.

For the purposes of the present invention, the term "axle" refers to the combination of one rotating shaft and at least one wheel (often at least one wheel on or at each end of the rotating shaft) mounted thereon for supporting a vehicle for movement on or over land.

For the purposes of the present invention, the term "axle count" refers to the number of axles of a vehicle which are counted.

For the purposes of the present invention, the term "vehicle axle counter unit" refers to a component, or combination of a plurality of components, which may be used to count the number of axles of a vehicle. Vehicle axle counter units may include optical counter units, mechanical counter units, etc.

For the purposes of the present invention, the term "optical counter unit" refers to a component, or combination of a plurality of components, which count the number of axles of a vehicle by using an optical beam. The optical beam used may be visible, invisible (e.g., ultraviolet (UV), infrared (IR)), etc. Optical counter units may include photodetectors, beam breaker detectors, motion detectors, etc.

For the purposes of the present invention, the term "mechanical counter unit" refers to a component, or combination of a plurality of components, which count the number of axles of a vehicle by using a mechanical device which senses, detects, etc., one or more wheels of an axle passing over it. Mechanical counter units may include pressure sensitive mats, pads, plates, hoses, etc.

For the purposes of the present invention, the term "vehicle weighing scale" refers to an instrument, device, apparatus, equipment, platform, etc., for determining the weight or mass of a vehicle in an unloaded or loaded condition. Vehicle weighing scales may include platform scales, pit scales, etc., and may also include, for example, ramps which permit the vehicle to enter (e.g., get on) and exit (e.g., leave or get off) the scale.

For the purposes of the present invention, the term "vehicle weighing area" refers to that area of a vehicle weighing scale (e.g., weighing platform) that a vehicle should be positioned on and within for correctly determining the weight or mass of the vehicle in a loaded and/or unloaded state.

For the purposes of the present invention, the term "platform scale" refers to a vehicle weighing scale wherein the vehicle weighing area is in the form of a weighing platform which may be, for example, generally rectangular in shape and which is normally completely (e.g., slightly) above the level of the remaining surface (e.g., ground, roadbed, scale bed, etc.) over which the vehicle moves to enter and exit the scale, and may include other scale equipment for recording the measured weight, transmitting the measured weight to other systems, devices (e.g., computers), etc., remote from the scale, etc. Platform scales may also require ramps (ascending and descending) so that the vehicle may enter and exit the weighing area.

For the purposes of the present invention, the term "pit scale" refers to a vehicle weighing scale wherein the vehicle weighing area may be, for example, in the form of a generally rectangular platform which is essentially flush with, or slightly below, the level of the remaining surface (e.g., ground, roadbed, scale bed, etc.) over which the vehicle moves to enter and exit the scale. Pit scales may also include mechanical scale heads and other scale equipment below the remaining surface (e.g., ground, roadbed, scale bed, etc.) of the scale.

For the purposes of the present invention, and with respect to a vehicle axle, the terms "pass over a vehicle entry edge," or "pass over a vehicle exit edge," of a vehicle weighing area refers to the wheel(s) of the vehicle axle having moved past the particular edge of the weighing area. As used herein, the term "pass completely over" the vehicle entry/exit edge refers to, respectively, the weight bearing portion of the wheel(s) in contact with the surface of the ground, roadbed, scale, etc., being completely within, or completely outside, the vehicle weighing area. For example, if a wheel of a vehicle is detected by a sensor (e.g., pressure sensitive mat) as it passes over or onto a vehicle entry/exit edge, but the weight bearing portion of the wheel remains in contact with the sensor (e.g., contact with the sensor indicates that the wheel is still not completely past the respective edge), the wheel has not passed completely over the respective edge.

For the purposes of the present invention, the term "processor" refers to a device capable of, for example, executing instructions, implementing logic, calculating and storing values, analyzing or evaluating data, etc. Exemplary processors may include application specific integrated circuits (ASIC), central processing units, microprocessors (e.g., for computers), such as, for example, microprocessors commercially available from Intel and AMD, etc.

For the purposes of the present invention, the term "data processor" refers to a processor capable of, or used in, analyzing or evaluating data.

For the purposes of the present invention, the term "computer" refers to any type of computer system that implements software including an individual computer such as a personal computer, server, mainframe computer, mini-computer, etc. In addition, a computer system refers to any type of network of computers, such as a network of computers in a business, the Internet, personal data assistant (PDA), devices such as a cell phone, etc. A personal computer is one type of computer system that may include the following components: a case or chassis in a tower shape (desktop) and the following parts: motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, scanner, webcam, audio devices, printers, monitors, etc.

For the purposes of the present invention, the term "in electronic communication" refers to two or more devices which are able to transmit electronic signals, data, etc., by a wired connection, wireless connection, or a combination of wired and wireless connections.

For the purposes of the present invention, the term "data" refers to any information, signal, etc., which quantifies, describes, records, identifies, etc., an attribute, characteristic, property, number, quantity, etc., for example, the number vehicle axles counted, whether the number of vehicle axles counted by different vehicle axle counter units are the same or different, whether a vehicle is positioned correctly or incorrectly within a vehicle weighing area, scale ticket number, identity of a vehicle, vehicle owner and/or operator, vehicle model and/or type, tare weight, gross weight, and/or net weight of a vehicle, time of weighing, purchase order number, etc.

For the purposes of the present invention, the terms "analyze," "analyzing," and "analyzed" refer to calculating, determining, assessing, processing, evaluating, resolving, etc., electronic data, for example, vehicle axle count data to determine the number of vehicle axles counted by a vehicle axle counter unit, etc.

For the purposes of the present invention, the term "software" refers to a general term used to describe any form of programmed machine-readable language or instructions (e.g., object code) that, when loaded or otherwise installed, provides operating instructions to a machine capable of reading those instructions, such as a computer or other type of computer program reader. The term software may include applications such as word processors which perform productive tasks for users, system software such as operating systems which interface with hardware to provide the necessary services for application software, device controllers (e.g., such as) which control the operation of devices such as (e.g., monitors), etc., and middleware which controls and co-ordinates distributed systems. Software may include programs, etc., that are coded by programming languages like C, C++, Java, etc. Software is usually regarded as anything but hardware, meaning the "hard" are the parts that are tangible (able to hold) while the "soft" part is the intangible objects inside the computer. Software is so called to distinguish it from computer hardware, which encompasses the physical interconnections and devices required to store and execute (or run) the software. At the lowest level, software may comprise a machine language specific to an individual processor. A machine language comprises groups of binary values signifying processor instructions which change the state of the computer from its preceding state. Software may be stored or reside on, as well as be loaded or installed from, one or more floppy disks, CD ROM disks, hard disks (internal or external), or any other form of suitable non-volatile electronic storage medium. Software may also be installed by downloading or by any other form of remote transmission.

For the purposes of the present invention, the term "transmission" refers to any type of transmission that may be carried out electronically by wired methods, wireless methods or combinations thereof Illustrative electronic transmissions may be carried out by a variety of remote electronic transmission methods, such as by using Local or Wide Area Network (LAN or WAN)-based, Internet-based, or web-based transmission methods, cable television or wireless telecommunications networks, other suitable remote transmission method, etc.

For the purposes of the present invention, the term "computer hardware" (hereafter referred to as "hardware") refers to digital circuitry and physical devices of a computer system, as opposed to software, which may be stored on a hardware device such as a hard disk. Illustrative examples of hardware may include the motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), the power supply, case control with cooling fan, storage controllers (CD-ROM, DVD, DVD-ROM, DVD Writer, DVD RAM Drive, Blu-ray, BD-ROM, BD Writer, floppy disks, USB Flash, tape drives, SATA, SAS), video controllers, sound cards, network controllers (modem, NIC), and other peripherals, including mice, keyboards, pointing devices, scanners, audio devices, printers, display devices (e.g., monitors), etc.

For the purposes of the present invention, the term "user" refers to an individual (or group of individuals) who are using embodiments of the present invention. The term user may also refer to a computer which inputs instructions, requests or queries, etc., to a computer system.

For the purposes of the present invention, the term "machine-readable medium" refers to any medium or media on which may be read, for example, by a computer, or any other device capable of reading programmed machine-readable language or instructions. Examples of machine-readable media may include floppy disks, Zip™ disks, CD-ROM, CD-R, CD-RW, DVD, DVD-R, memory sticks, flash memory, hard disks (internal or external), optical disks, etc.

For the purposes of the present invention, the term "Internet" refers to a global system of interconnected computer networks that interchange data by packet switching using the standardized Internet Protocol Suite (TCP/IP). The Internet may carry various information resources and services, such as electronic mail, online chat, file transfer and file sharing, online gaming, and the inter-linked hypertext documents and other resources of the World Wide Web (WWW).

For the purposes of the present invention, the term "local area network (LAN)" refers to a network covering a small geographic area, such as a home, office, building, office site, etc. The defining characteristics of LANs, in contrast to WANs (wide area networks), include their higher data transfer rates, smaller geographic range, lack of a need for leased telecommunication lines, etc.

For the purposes of the present invention, the term "remotely accessible" (and related terms such as "remotely access") refers to the ability to input, access, retrieve, download, transmit, etc., data, software, etc., which is stored remotely from the user by using a remote electronic transmission method.

For the purposes of the present invention, the term "electronic database" refers to a database on which data, software, etc., is electronically stored on a computer, and which may be electronically accessed, for example, to input data, to input an activation code, etc., to retrieve data, software, etc.

For the purposes of the present invention, the term "scale ticket electronic database" refers to an electronic database which collects, records, stores, etc., a plurality of scale tickets and which may be queried, for example, to identify which scale tickets correspond to vehicles which have been correctly positioned during weighing, as well as which scale tickets correspond to vehicles which have been incorrectly positioned during weighing.

For the purposes of the present invention, the term "scale ticket" refers to electronic data, a hard copy document (e.g., a physical medium), etc., which is used to record, document, register, etc., a vehicle weighing event for a vehicle, including, for example, the identity of the vehicle, the tare, gross, and/or net weight of the vehicle, the number of axles counted before and after weighing, the time of weighing, purchase order number, etc. The scale ticket may also have indicia (e.g., alphanumeric characters, code, etc.) for identifying and differentiating each scale ticket from other scale tickets (hereafter collectively referred to as a "scale ticket number").

For the purposes of the present invention, the terms "query," and "querying" refer to an electronic request transmitted to an electronic database to provide information, data, etc., contained in the electronic request from the electronic database.

For the purposes of the present invention, the term "report" refers to any response, answer, reply, etc., to an electronic request, and which may be provided as an organized collection of data, etc., to such a request.

For the purposes of the present invention, the term "crystal report" refers to a report provided, generated, etc., by a business intelligence (e.g., software) application designed to generate reports from a wide range of data sources, and which may be used to obtain, provide, generate, etc., a report from a scale ticket database.

Description

In some weighing operations, the vehicle weighing scale, such as a platform scale, employs scale operator. A platform scale may include, for example, a generally rectangular weighing platform which is mounted, for example, slightly above the roadbed or scale bed to facilitate driving the vehicle onto and off of the weighing platform and which may be, for example, about ten feet wide by about thirty to eighty feet in length. The scale operator may be located in a scale house positioned to one side of the weighing platform. From this vantage point of this scale house, it may be difficult for the scale operator to ascertain whether the vehicle is properly positioned on the weighing platform.

In fact, the scale operator's view of the vehicle may be obstructed, particularly with respect to the positioning of the wheels and axles of the vehicle relative to the perimeter of the weighing platform, thus making it extremely difficult for the scale operator to detect a vehicle which is an improperly or incorrectly positioned on the weighing platform. For example, with a truck having a relatively long tractor and trailer combination, one or more of the axles of the trailer may be improperly positioned or hanging off, i.e., outside the perimeter at the vehicle entry point of the weighing platform. Similarly, one or more axles of the tractor may be improperly positioned or hanging off, i.e., outside the perimeter at the vehicle exit point of the weighing platform. Even if the scale operator has a clear vantage point from the scale house to see all portions of the weighing platform, as well as the wheels and axles of the vehicle being weighed, the routine and monotonous nature of the weighing operation may lead to carelessness on the part of the scale operator such that vehicles improperly positioned on the weighing platform may go undetected during weighing of the vehicle. Such undetected improper or incorrect positioning of the vehicle on the weighing platform during unloaded or tare weighing of the vehicle is a particularly significant issue if the operator of the vehicle is being paid based on a "weight of load" basis, i.e., the vehicle operator will be paid more than the load is actually worth.

Embodiments of the system and method of the present invention are directed at providing the ability to automatically detect whether the unloaded vehicle is correctly (or incorrectly) positioned on the weighing area of the scale, including recording, documenting, registering, etc., weighing of each such unloaded vehicle so as to identify whether or not the unloaded vehicle is correctly (or incorrectly) positioned during weighing. In one embodiment of the present invention, a vehicle weighing system is provided which comprises a vehicle weighing scale having a vehicle weighing area for weighing an unloaded vehicle having a plurality of vehicle axles, wherein the vehicle weighing area has a vehicle entry edge and a vehicle exit edge. The vehicle weighing system is also provided with a first vehicle axle counter unit which is activated to count the number of vehicle axles which pass completely over the vehicle entry edge before weighing of the unloaded vehicle, as well as a second vehicle axle counter unit which is activated to count the number of vehicle axles which pass completely over the vehicle exit edge after weighing of the unloaded vehicle. The number of vehicle axles counted by the first and second counter units are recorded by a scale ticket such that: (i) when the number of vehicle axles counted by the first and second counter units are same, the unloaded vehicle is correctly positioned in the vehicle weighing area; and (ii) when the number of vehicle axles counted by the first and second counter units is different, the unloaded vehicle is incorrectly positioned in the vehicle weighing area.

In another embodiment of the present invention, a method is provided for recording the number axles counted before and after weighing of the unloaded vehicle by the vehicle weighing system. In this method, the first vehicle axle counter unit is activated to count the number of vehicle axles which pass completely over the vehicle entry edge before weighing of the unloaded vehicle. The second vehicle axle counter unit is activated to count the number of vehicle axles which pass completely over the vehicle exit edge after weighing of the unloaded vehicle. A scale ticket is generated to record the number of vehicle axles counted by the first and second counter units such that: (i) when the number of vehicle axles counted by the first and second counter units are same, the unloaded vehicle is correctly positioned in the vehicle weighing area; and (ii) when the number of vehicle axles counted by the first and second counter units is different, the unloaded vehicle is incorrectly positioned in the vehicle weighing area.

In another embodiment of the present invention, a scale ticket data system is provided which comprises a plurality of scale tickets, each scale ticket comprising vehicle axle count data for an unloaded and weighed vehicle. The vehicle axle count data contains a first number of vehicle axles counted before weighing of the unloaded vehicle which pass completely over a vehicle entry edge of a weighing vehicle area, as well as a second number of vehicle axles counted after weighing of the unloaded vehicle which pass completely over a vehicle exit edge of the vehicle weighing area. The scale ticket data system also comprises a scale ticket electronic database which contains the plurality of such scale tickets. The scale ticket electronic database also identifies: (i) those scale tickets corresponding to an unloaded and weighed vehicle which is correctly positioned in the vehicle weighing area wherein the first and second numbers are the same; and (ii) those scale tickets corresponding to an unloaded and weighed vehicle which is incorrectly positioned in the vehicle weighing area wherein the first and second numbers are different.

In another embodiment of the present invention, a method is provided for querying the scale ticket electronic database to identify which unloaded vehicles are properly (or improperly) positioned during weighing. In this method, a scale ticket electronic database is provided comprising the plurality of scale tickets. The scale ticket database may then be queried to identify: (i) those scale tickets corresponding to an unloaded and weighed vehicle which is correctly positioned in the vehicle weighing area wherein the first and second numbers are the same; and/or (ii) those scale tickets corresponding to an unloaded and weighed vehicle which is incorrectly positioned in the vehicle weighing area wherein the first and second numbers are different.

Figure 2:
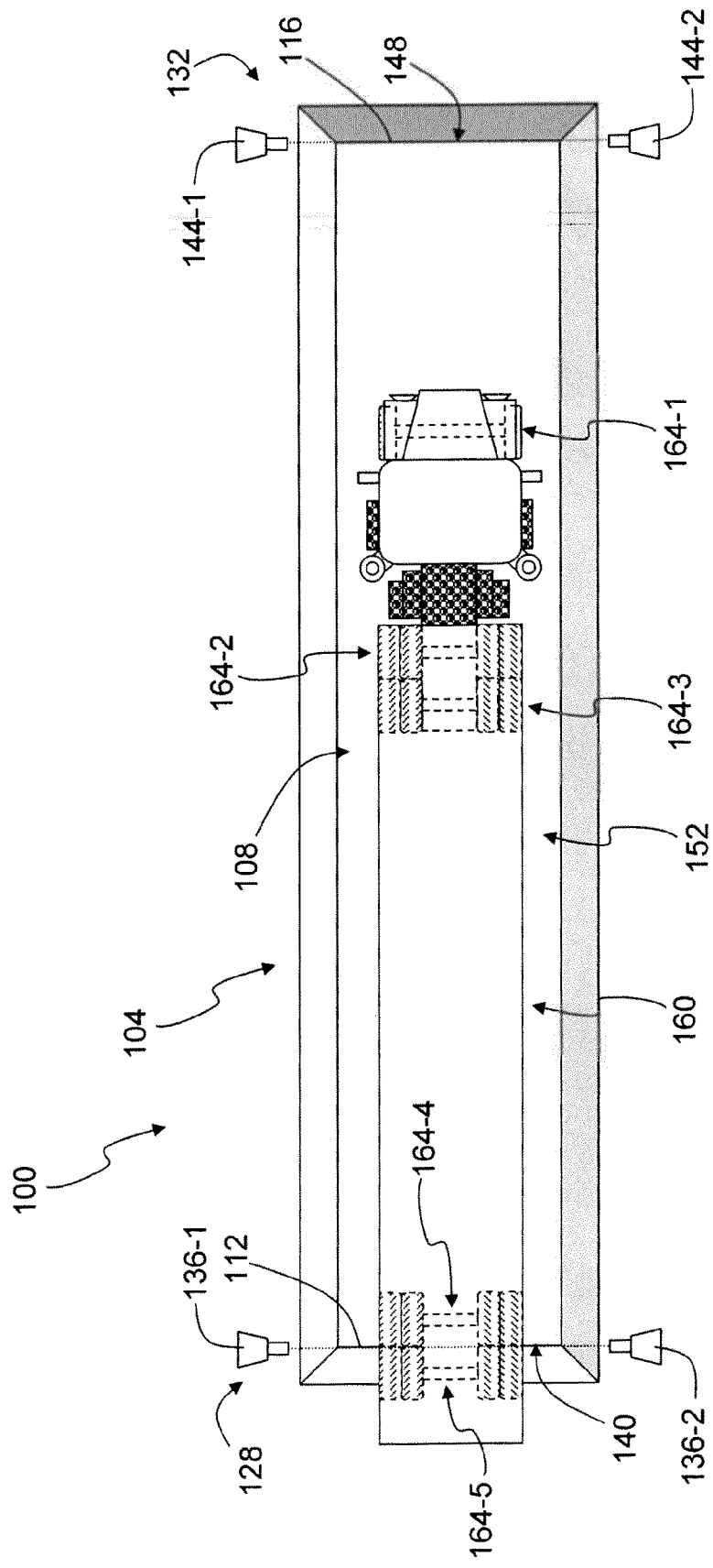
FIG. 2 is a top plan view of the vehicle weighing system similar to that of FIG. 1, but showing the rear most axle of the trailer of the truck outside the weighing area of the scale.
Figure 3:
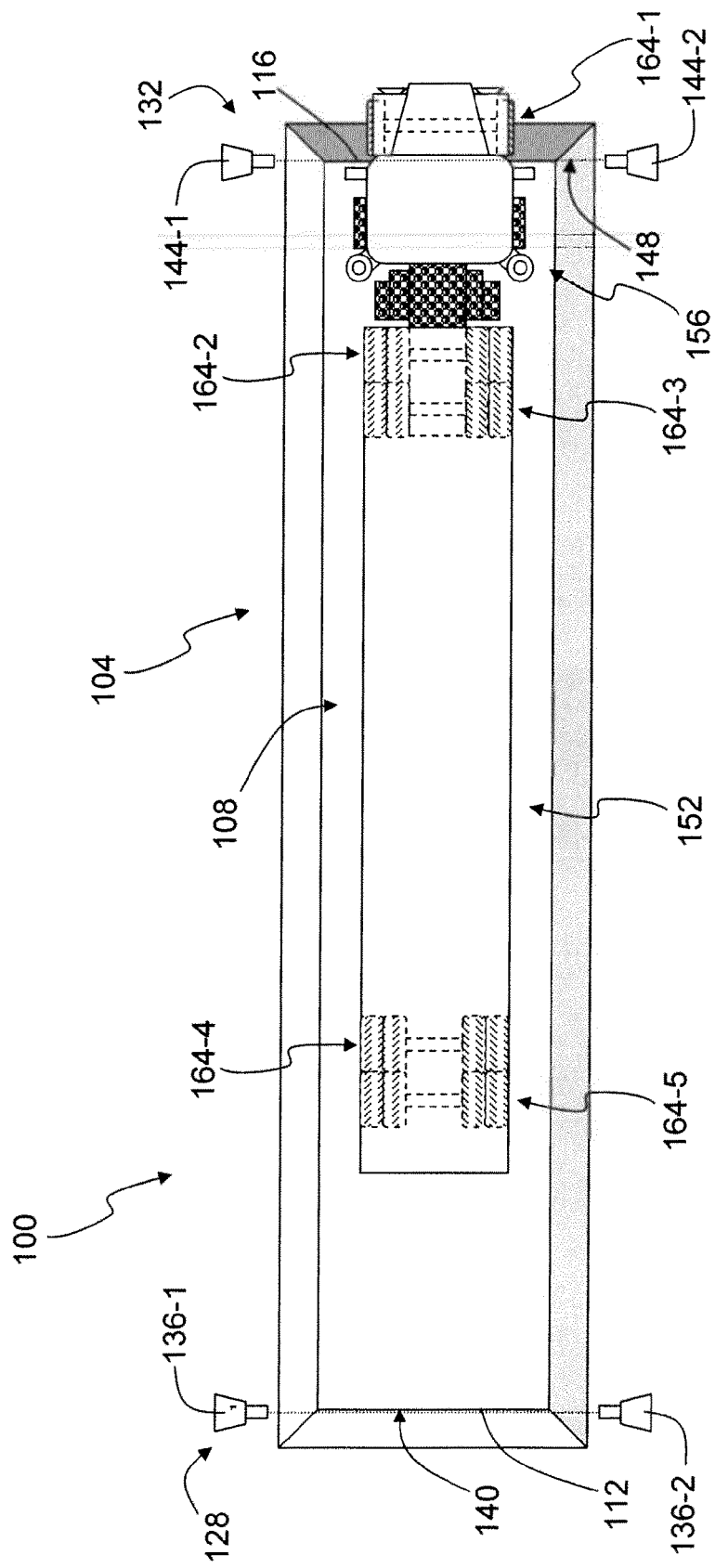
FIG. 3 is a top plan view of the vehicle weighing system similar to that of FIG. 1, but showing the front most axle of the tractor of the truck outside the weighing area of the scale.

An embodiment of a vehicle weighing system of the present invention which counts vehicle axles before and after weighing of the unloaded vehicle is further illustrated in FIGS. 1-3 and is generally indicated as 100. Referring to FIG. 1, system 100 may comprise a vehicle weighing scale, indicated generally as 104. Scale 104 may have a generally rectangular a vehicle weighing area, which is indicated generally as 108, and which may include, or be in the form of, a weighing platform (e.g., for a platform scale, slightly above the ground or scale level of the remaining portions of scale 104, or for a pit scale, essentially flush with the ground or scale level of the remaining portions of scale 104), etc. The perimeter of weighing area 108 is defined by a forward or front vehicle entry edge 112 (which may also, but not necessarily, correspond to the forward or front edge of the weighing platform for a platform or pit scale 104), a rearward or back vehicle exit edge 116 (which may also, but not necessarily, correspond to the rearward or back edge of the weighing platform for a platform or pit scale 104), and a pair of laterally spaced apart and parallel side edges 120 and 124.

System 100 is also provided with a first or forward vehicle axle counter unit, indicated generally as 128, which may be positioned proximate or near vehicle entry edge 112, and a second or rearward vehicle axle counter unit, indicated generally as 132, which may be positioned proximate or near vehicle exit edge 116. (Vehicle axle counter unit 126 may also be referred to as the vehicle entry axle counter unit, while vehicle axle counter unit 132 may also be referred to as the vehicle exit axle counter unit.) In one embodiment, and as shown in FIG. 1, first counter unit 128 may comprise a pair of spaced apart optical counter components 136-1 and 136-2. One of the optical counter components 136-1 and 136-2 may be a beam generator which generates an optical beam (e.g., light beam), indicated as 140, which may then be detected by the other of the counter components 136-1 and 136-2 which functions as the beam detector (e.g., a photodetector, beam breaker detector, etc.). As shown in FIG. 1, beam 140 may be aligned with, or at least parallel to, vehicle entry edge 112. For the purposes of illustration, counter component 136-1 is designated as the beam generator, while counter component 136-2 is designated at the beam detector (but which designation may also be reversed with component 136-2 being the beam generator and component 136-1 being the beam detector). Beam generator 136-1 and beam detector 136-2 are also positioned such that beam 140 may be blocked, obstructed, interrupted, etc., by the wheels of each of the vehicle axles upon reaching the vicinity of vehicle entry edge 112 until the weight bearing portion of the wheels (of a given axle) in contact with weighing area 108 of scale 104 have passed completely over vehicle entry edge 112.

Similarly, second counter unit 132 may also comprise a pair of spaced apart optical counter components 144-1 and 144-2. Again, one of the optical counter components 144-1 and 144-2 is a beam generator which generates an optical beam (e.g., light beam), indicated as 148 which may be detected by the other of counter components 144-1 and 144-2 which functions as the beam detector (e.g., a photodetector, beam breaker detector, etc.). As shown in FIG. 1 and similar to beam 140, beam 148 may be aligned with or parallel to vehicle entry exit 116. Again, for the purposes of illustration, counter component 144-1 is designated as the beam generator, while counter component 144-2 is designated at the beam detector (but which designation may also be reversed with component 144-2 being the beam generator and component 144-1 being the beam detector). Similar to beam generator 136-1 and beam detector 136-2, beam generator 144-1 and beam detector 144-2 are also positioned such that beam 148 may be blocked obstructed, interrupted, etc., by the wheels of each of the vehicle axles upon reaching the vicinity of vehicle exit edge 116 until the portion of the wheels (of a given axle) in contact with the surface of scale 104 have passed completely over vehicle exit edge 116.

System 100 is used to determine whether or not an unloaded vehicle, indicated generally as 152, which is being weighed by scale 104, is positioned correctly within weighing area 108. For purposes of illustration, truck 152 is shown in the form of a truck which has a tractor 156 and a trailer 160 (i.e., for carrying the load, such as wood materials, etc.). As shown in FIG. 1, truck 152 has, for example, five axles which are numbered 164-1 through 164-5. Tractor 156 is mounted on a forward most axle 164-1 (having a pair of wheels 168-1 and 168-2), a middle axle 164-2 (having two sets of pairs of wheels 168-3 and 168-4), and a rear most axle 164-3 (also having two sets of pairs of wheels 168-5 and 168-6), while rearward end 172 of trailer 160 is mounted on and over a forward most axle 164-4 (having two sets of pairs of wheels 168-7 and 168-9) and a rear most axle 164-5 (also having two sets of pairs of wheels 168-9 and 168-10). The forward end 176 of trailer 160 is mounted on and over trailing end 180 of tractor 156 and over axles 164-2 and 164-3, i.e., trailer 160 is in the form of a semi-trailer.

In operation, first axle counter unit 128 is activated (e.g., turned on) before unloaded truck 152 moves forward onto scale 104 or at least into weighing area 108. As unloaded truck 152 moves forward over vehicle entry edge 112, first axle counter unit 128 counts how many of axles 164-1 through 164-5 pass completely over vehicle entry edge 112. For example, as wheels 168-1 and 168-2 of axle 164-1 initially pass through beam 140 of first unit 128, the passage of beam 140 from generator 136-1 towards detector 136-2 is blocked, obstructed, interrupted, etc., by wheels 168-1 and 168-2. As soon as wheels 168-1 and 168-2 pass completely over vehicle entry edge 112 such that the portion of wheels 168-1 and 168-2 contacting the surface of scale 104 are completely within weighing area 108, the passage of beam 140 is no longer interrupted (i.e., blocked, obstructed, etc.) by wheels 168-1 and 168-2 so that beam 140 is again detected by beam detector 136-2. As a result, first axle counter unit 128 records and transmits, for example, a signal to system 100 that one axle (i.e., axle 164-1) has been detected which has passed completely over vehicle entry edge 112. As each of remaining axles 164-2 through 164-5 pass completely over vehicle entry edge 112 (i.e., like axle 164-1), additional signals are recorded and transmitted by first axle counter unit 128 to system 100 to indicate the additional axles counted by first axle counter unit 128 which have been detected and which have passed completely over vehicle entry edge 112. After axle 164-5 has passed completely over vehicle entry edge 112, first axle counter unit 128 will have indicated (e.g., recorded and transmitted) to system 100 that five total axles (i.e., axles 164-1 through 164-5) were counted as passing completely over vehicle entry edge 112. At this point, system 100 records and fixes (e.g., before weighing, as well as before generating a scale ticket in some embodiments of system 100) the total number of axles counted for unloaded truck 152 by first axle counter unit 128 as completely passing over vehicle entry edge 112 before unloaded truck 152 is weighed in weighing area 108 by scale 104.

After first axle counter unit 128 counts the number of axles of unloaded truck 152 which pass completely over vehicle entry edge 112, first axle counter unit 128 may be deactivated (e.g., disconnected, turned off, etc.) After first axle counter unit 128 is deactivated, and before, during or after scale 104 weighs unloaded truck 152 (i.e., determines the tare weight of truck 152) in weighing area 108, second axle counter unit 132 is activated (e.g., turned on). Once second axle counter unit 132 is activated and after unloaded truck 152 is weighed, weighed unloaded truck 152 then moves forward towards vehicle exit edge 116 of weigh area 108. As each of axles 164-1 through 164-5 (and corresponding wheels 168-1 through 168-10) pass completely over vehicle exit edge 116, the second axle counter unit 132 (like the first axle counter unit) will count each of axles 164-1 through 164-5 due to the successive interruption (as wheels 168-1 through 168-10 block obstruct, etc., beam 148) and resumption (as wheels 168-1 through 168-10 no longer block, obstruct, etc., beam 148) of the passage of beam 148 between beam generator 144-1 and beam detector 144-2. Second axle counter unit 132 will also record and transmit successive signals indicating that five axles (i.e., axles 164-1 through 164-5) are counted as completely passing over vehicle exit edge 116 as unloaded truck 152 leaves weighing area 108. The number of axles 164-1 through 164-5 counted by first axle counter unit 128 and second axle counter unit 132 may then be recorded on a scale ticket (e.g., as electronic data, hard copy document, or both) which is generated by system 100 (e.g., after second axle counter unit 132 counts the number of axles 164-1 through 164-5 passing completely over vehicle exit edge 116), along with other data such as scale ticket number, one or more unique identifiers for identifying unloaded vehicle 152 (e.g., alphanumeric number, symbol, etc., name of the operator and/or owner of unloaded vehicle 152, etc.), model number, type, etc., of unloaded truck 152, the tare weight of unloaded truck 152 measured by scale 104, the purchase order number, etc. When the number of axles (five total) counted by first axle counter unit 128 when unloaded truck 152 enters weighing area 108 (i.e., passing completely over vehicle entry edge 112) are compared to the number of axles (five total) counted by second axle counter unit 132 after unloaded truck 152 exits weighing area 108 (i.e., passing completely over vehicle exit edge 116), the scale ticket generated by system 100 will show, identify, confirm, etc., that the number of axles counted by units 128 and 132 (before and after leaving weighing area 108) are the same, thus indicating that unloaded truck 152 is correctly positioned within weighing area 108 during weighing, and thus the tare weight of unloaded truck 152 measured by scale 104 correctly and accurately reflects the weight of the unloaded truck 152 leaving scale 104.

While system 100 is shown in FIG. 1 as having unloaded truck 152 enter weighing area 108 from the left (over vehicle entry edge 112) and exit from weighing area 108 to the right, in some embodiments, system 100 may also permit unloaded truck 152 to enter from the right (with edge 116 becoming the vehicle entry edge) and exit to the left (with edge 112 becoming the vehicle exit edge). When system 100 permits unloaded truck 152 to enter from the right and exit to the left, unit 132 now becomes the first axle counter unit, while unit 128 now becomes the second axle counter unit. System 100 may also be programmed, instructed, etc., to change, switch, etc., which of axle counter units 128 and 132 are the first and second axle counter units depending upon which direction (left to right, or right to left) that unloaded truck 152 enters and exits weighing area 108 of scale 104.

FIG. 2 illustrates a situation where the rear most axle 164-5 of trailer 160 is positioned outside of weighing area 108, i.e., the rearward end of unloaded truck 152 is hanging off scale 104, resulting in a measurements of the tare weight of unloaded truck 152 which is not correct or accurate. Because of the positioning of unloaded truck 152 as shown FIG. 2, the first axle counter unit 128 (which is activated before unloaded truck 152 enters weighing area 108), will only count four total axles (i.e., axles 164-1 through 164-4, but not axle 164-5) as passing completely over vehicle entry edge 112 before the point at which the number of axles counted by first axle counter unit 128 is recorded and fixed by system 100 before weighing of unloaded truck 152. Before, during, or after unloaded truck 152 is weighed and before moving forward to leave weighing area 108, the second axle counter unit 132 is then activated. The second axle counter unit will thus count five total axles (i.e., axles 164-1 through 164-5) as passing completely over vehicle exit edge 116. By comparing the number of axles (four total) counted by first axle counter unit 128 before weighing of unloaded truck 152 with the number of axles (five total) counted by second axle counter unit 132 after weighing of unloaded truck 152 and upon exiting weighing area 108, system 100 will know and show that the number of axles counted by units 128 and 132 (before and after weighing unloaded vehicle 152) are different, thus indicating that unloaded truck 152 is incorrectly positioned within weighing area 108 before weighing, and thus that the unloaded truck 152 was incorrectly and inaccurately weighed before leaving weighing area 108.

FIG. 3 illustrates a similar situation where the forward most axle 164-1 of tractor 156 is positioned outside of weighing area 108, i.e., the forward end of unloaded truck 152 is hanging off scale 104, resulting in a measurements of the tare weight of truck 152 which is also not correct or accurate. Because of the positioning of unloaded truck 152 as shown FIG. 3, the first axle counter unit 128 (which is activated before unloaded truck 152 enters weighing area 108), will count five total axles (i.e., axles 164-1 through 164-5) as passing completely over vehicle entry edge 112 before the point at which the number of axles counted by first axle counter unit 128 is recorded and fixed by system 100 before weighing of unloaded truck 152. Before, during, or after unloaded truck 152 is weighed and before moving forward to leave weighing area 108, the second axle counter unit 132 is then activated. Because axle 164-1 was already positioned beyond vehicle exit edge 116 before second axle counter unit 132 was activated, second axle counter unit 132 will only count four total axles (i.e., axles 164-2 through 164-5, but not axle 164-1) as passing completely over vehicle exit edge 116 as unloaded vehicle 152 leaves weighing area 108. By comparing the number of axles (five total) counted by first axle counter unit 128 before weighing of unloaded truck 152 with the number of axles (four total) counted by second axle counter unit 132 after weighing of unloaded truck 152 and upon exiting scale 104, system 100 will again know and show that the number of axles counted by units 128 and 132 (before and after weighing of unloaded truck 152) are different, thus again indicating that unloaded truck 152 is incorrectly positioned within weighing area 108 before weighing, and thus that unloaded truck 152 was incorrectly and inaccurately weighed before leaving scale 104.

Figure 4:
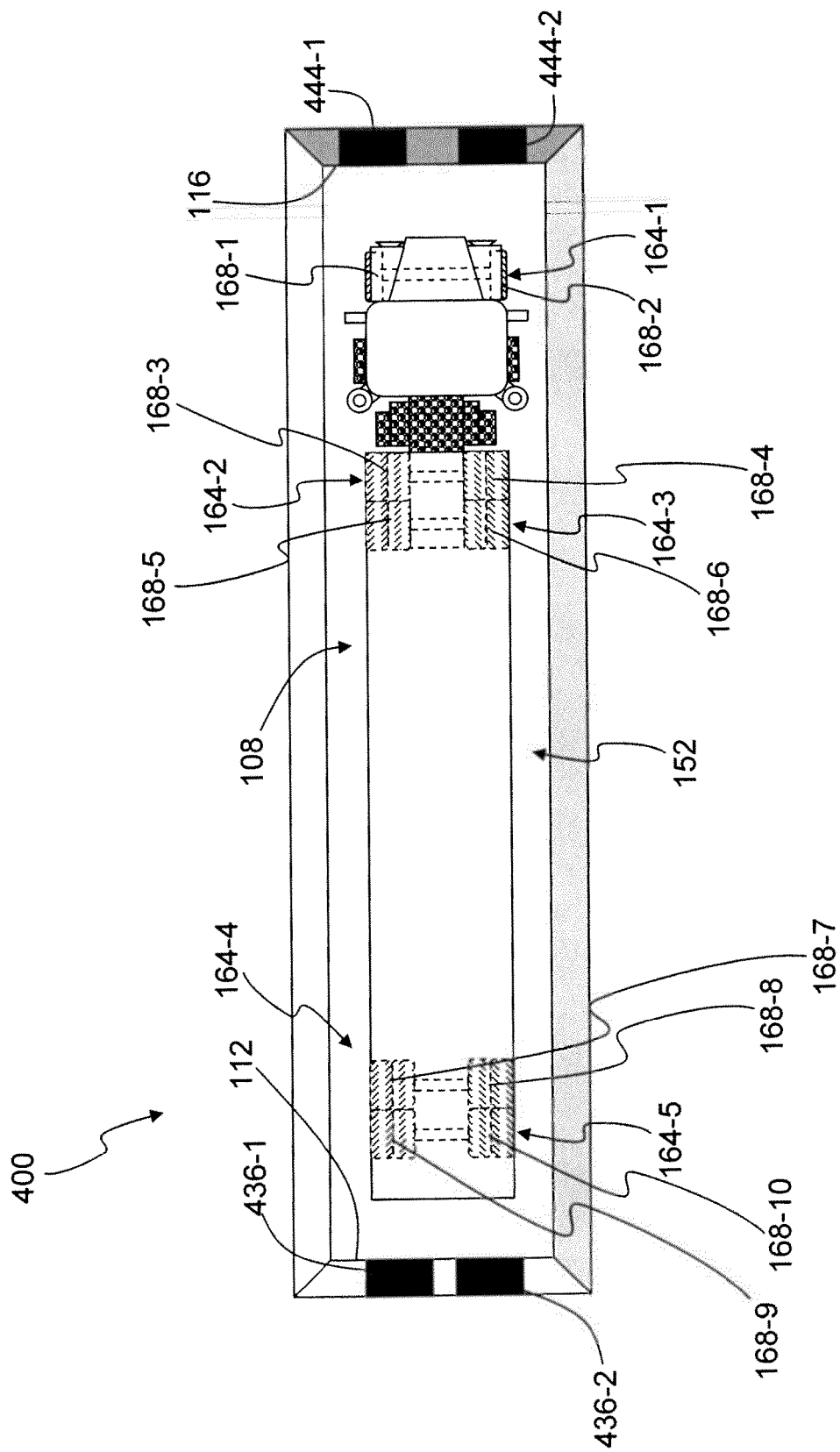
FIG. 4 is a top plan of a different embodiment of the vehicle weighing system of FIG. 1.

In some embodiments of system 100, optical counter components 136-1 and 136-2 of first axle counter unit 128, as well as optical counter components 144-1 and 144-2 of second axle counter unit 132, may be replaced by one or more mechanical counter components such as pressure sensitive mats, pads, plates, hoses, etc. For example, each of components 136-1, 136-2, 144-1, and 144-2 may be replaced by a pressure sensitive mat which is positioned to detect the passage of wheels 168-1 through 168-10 thereover, thus counting axles 164-1 through 164-5 from both sides of unloaded truck 152. Such an alternative embodiment of system 100 is illustrated in FIG. 4, and is designated generally as system 400. In system 400, each of optical counter components 136-1, 136-2, 144-1, and 144-2 is replaced by a pressure sensitive mat, designated, respectively, as 436-1, 436-2, 444-1, and 444-2. Mats 436-1 and 436-2 function to detect the passage of wheels 168-1 through 168-10 over vehicle entry edge 112 as truck 152 enters weighing area 108. Similarly, mats 444-1 and 444-2 function to detect the passage of wheels 168-1 through 168-10 over vehicle exit edge 112 as truck 152 exits weighing area 108. As also illustrated in system 400 of FIG. 4, pressure sensitive mats 436-1/436-2, as well as pressure sensitive mats 444-1/444-2, need not extend across entire the width of vehicle entry edge 112 and/or vehicle exit edge 116.

Figure 5:
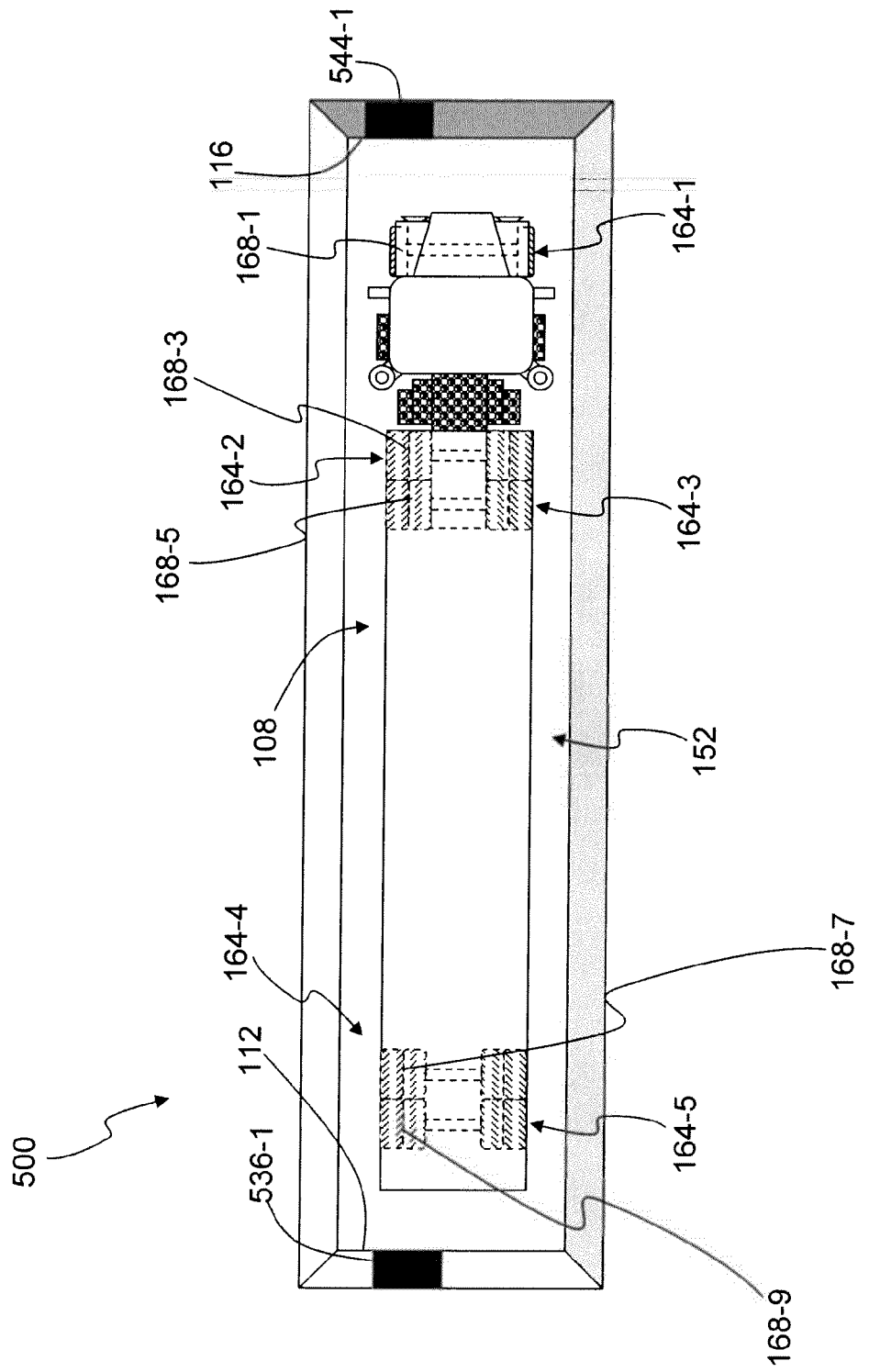
FIG. 5 is a top plan view of a different embodiment of the vehicle weighing system of FIG. 4.

In some embodiments, only one of pressure sensitive mats 436-1 and 436-2 components may be used to detect the wheel (s) on one end of each of axles 164-1 through 164-5 (i.e., detect wheels 168-1, 168-3, 168-5, 168-7, and 168-9, or wheels 168-2, 168-4, 168-6, 168-8, and 168-10, on one side of unloaded truck 152) passing over vehicle entry edge 112, thus also detecting axles 164-1 through 164-5 entering weighing area 108. Similarly, only one of pressure sensitive mats 444-1 and 444-2 may be used to detect the wheel(s) on one end of each of axles 164-1 through 164-5 (i.e., detect wheels 168-1, 168-3, 168-5, 168-7, and 168-9 or wheels 168-2, 168-4, 168-6, 168-8, and 168-10, on one side of unloaded truck 152) passing over vehicle exit edge 116, thus also detecting axles 164-1 through 164-5 exiting weighing area 108. In this alternative embodiment, only pressure sensitive mats 436-1 and 444-1 (or only pressure sensitive mats 436-2 and 444-2) may be used which are positioned on the same side to detect wheel(s) on one end of axles 164-1 through 164-5 (e.g., detects wheels 168-1, 168-3, 168-5, 168-7, and 168-9, or wheels 168-2, 168-4, 168-6, 168-8, and 168-10, on axles 164-1 through 164-5 along the same side of unloaded truck 152). Such an alternative embodiment of system 400 is illustrated in FIG. 5, and is designated generally as system 500. The embodiment of system 500 illustrated in FIG. 5 shows pressure sensitive mat 536-1 positioned to detect the passage of wheels 168-1, 168-3, 168-5, 168-7, and 168-9 over vehicle entry edge 112 as unloaded truck 152 enters weighing area 108. Similarly, and as also shown in FIG. 5, pressure sensitive mat 544-1 mat (positioned on the same side as pressure sensitive mat 536-1) detects the passage of wheels 168-1, 168-3, 168-5, 168-7, and 168-9 over vehicle exit edge 112 as unloaded truck 152 exits weighing area 108.

Figure 6:
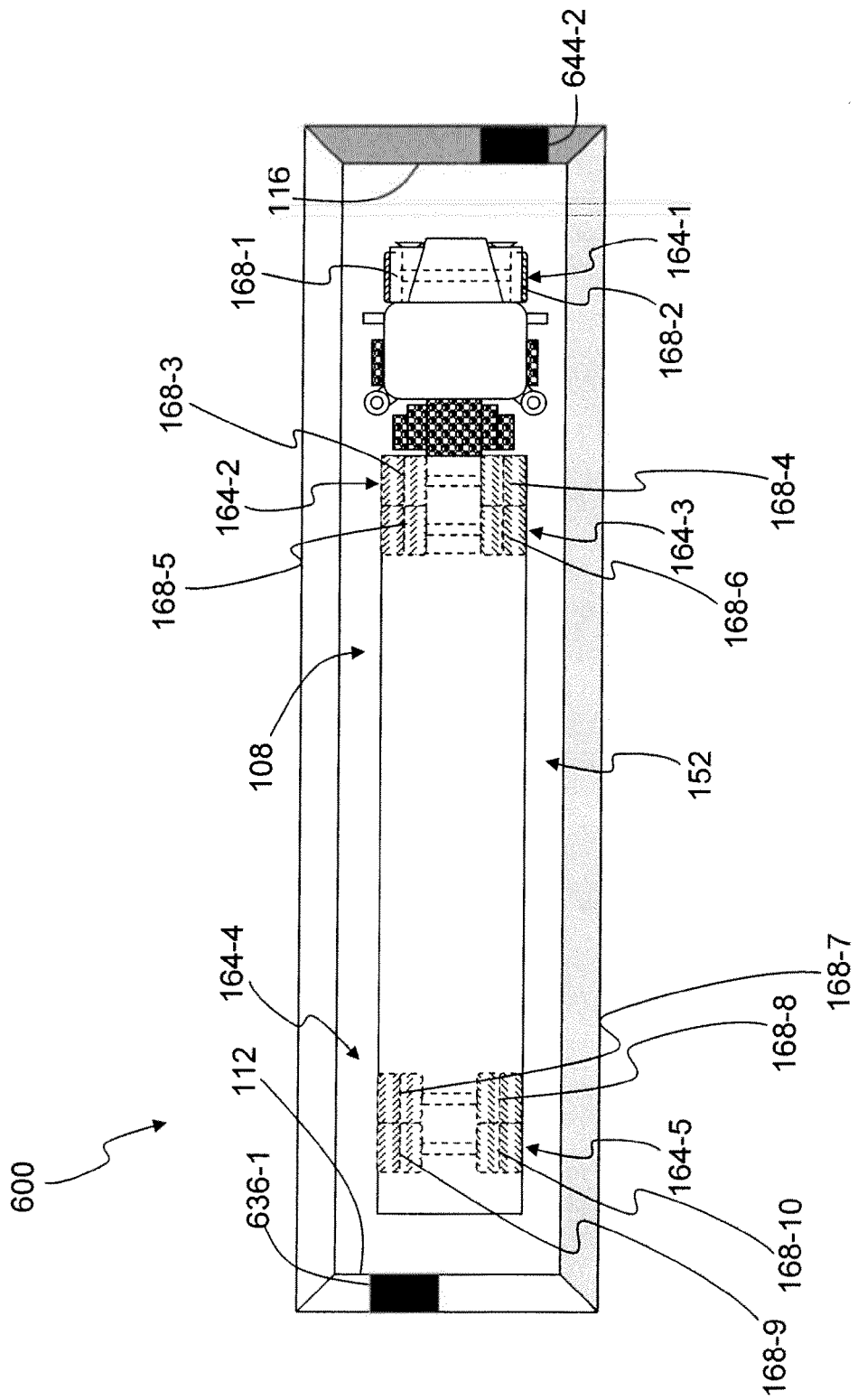
FIG. 6 is a top plan view of a different embodiment of the vehicle weighing system of FIG. 5.

In a different version of the alternative embodiment shown in FIG. 5, one of pressure sensitive mats 436-1/436-2) and one of pressure sensitive mats 444-1/444-2 may also be positioned in a diagonal orientation, configuration, etc., to detect wheel(s) on different ends of axles 164-1 through 164-5. One such embodiment is shown in FIG. 6, and is designated generally as system 600. As shown in FIG. 6, system 600 is illustrated (in one embodiment) as having one pressure sensitive mat 636-1 positioned to detect wheels 168-1, 168-3, 168-5, 168-7, and 168-9 on axles 164-1 through 164-5 passing over vehicle entry edge 112 along one side of unloaded truck 152. Similarly, pressure sensitive mat 644-2 (positioned diagonally relative to pressure sensitive mat 636-1) detects wheels 168-2, 168-4, 168-6, 168-8, and 168-10 on axles 164-1 through 164-5 passing over vehicle exit edge 116 along the other side of unloaded truck 152.

Figure 7:
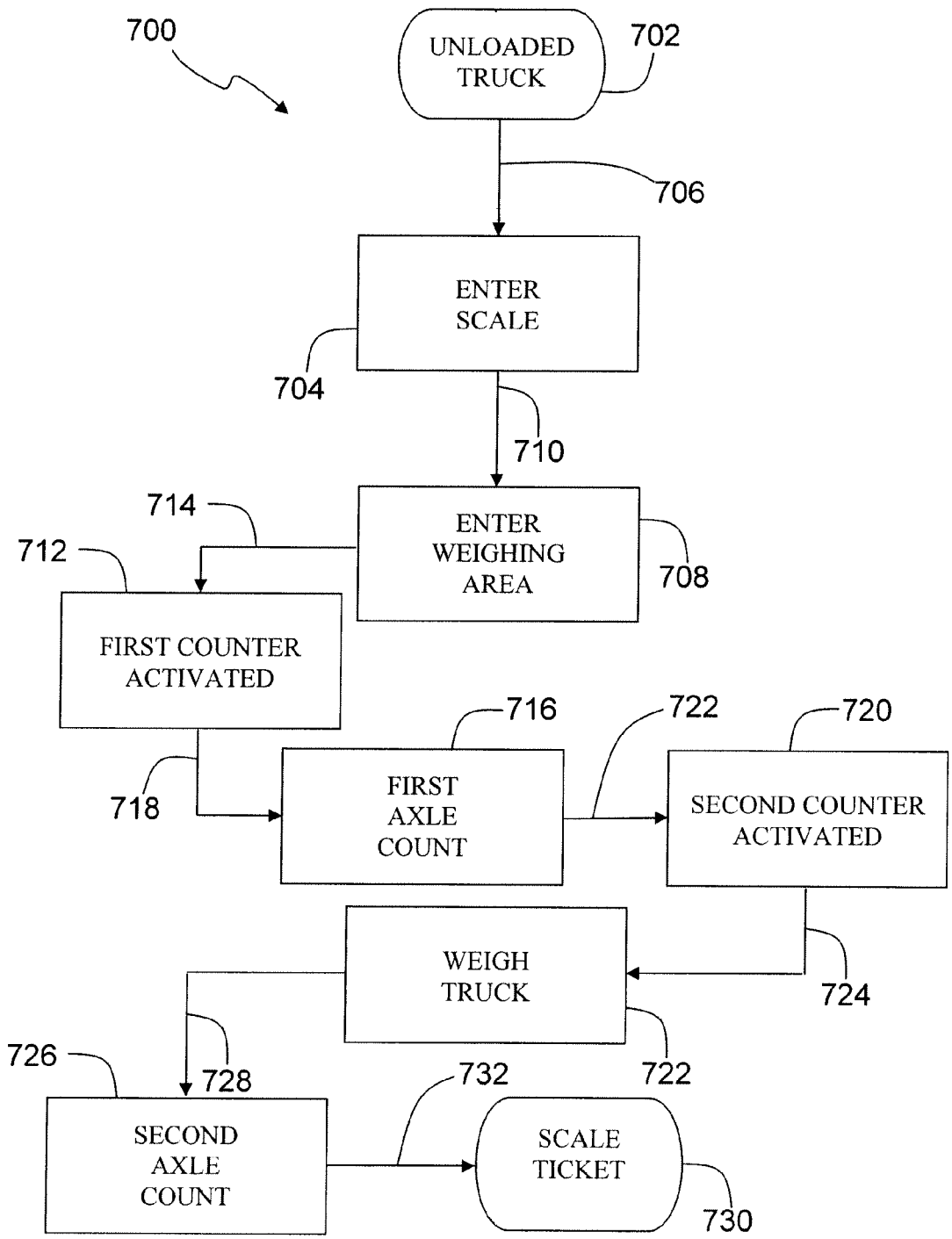
FIG. 7 is a flowchart of an embodiment of a method for generating a scale ticket from the systems shown in FIGS. 1-6.

FIG. 7 is a flowchart illustrating an embodiment of a method for generating a scale ticket from embodiments of systems 100, 400, 500, and 600 shown in FIGS. 1-6, and which is indicated generally as 700. In method 700, the unloaded truck 152 to be weighed (indicated in FIG. 7 as Unloaded Truck 702) enters the weighing scale 104 (indicated in FIG. 7 as Enter Scale step 404), as indicated by arrow 706. After Enter Scale step 704, Unloaded Truck 702 then moves forward and enters weighing area 108 (indicated in FIG. 7 as Enter Weighing Area step 708), as indicated by arrow 710. After Enter Weighing Area step 708 and before weighing Unloaded Truck 702, as well as generating a scale ticket, first axle counter unit 128 is activated (indicated in FIG. 7 as First Counter Activated step 712), as indicated by arrow 714. After First Counter Activated step 712 is performed, activated first axle counter unit 128 counts the number of axles of Unloaded Truck 702 (indicated in FIG. 7 as First Axle Count step 716) which pass completely over vehicle entry edge 112 and into weighing area 108, as indicated by arrow 718. After First Axle Count step 716 is performed (which may include in some embodiments subsequent deactivation of first axle counter unit 128), second axle counter unit 132 is activated (indicated in FIG. 7 as Second Counter Activated step 720), as indicated by arrow 722, which may occur before, during or after weighing of Unloaded Truck 702. At some point after Second Counter Activated step 720 is performed, Unloaded Truck 702 is weighed (indicated in FIG. 4 as Weigh Truck step 722), as indicated by arrow 724. After Weigh Truck step 722 is performed, activated second axle counter unit 132 counts the number of axles of Unloaded Truck 702 (indicated in FIG. 7 as Second Axle Count step 726) which pass completely over vehicle exit edge 116 and out of weighing area 108, as indicated by arrow 728. After Second Axle Count step 726 is performed, a scale ticket is generated (indicated in FIG. 7 as Scale Ticket 730), as indicated by arrow 732. Scale Ticket 730 records and may contain one or more unique identifiers for identifying Unloaded Truck 702 (e.g., operator and/or owner identification, truck model and/or type, etc.), the tare weight measured for Unloaded Truck 702 by scale 104, scale ticket number, time of weighing, purchase order number, etc., as well as vehicle axle count data obtained during First Axle Count step 716 and Second Axle Count step 726. Scale Ticket 730 may be generated as a hard copy document, but is also at least generated in the form of electronic data for transmission to a scale ticket electronic database, as described below.

Figure 8:
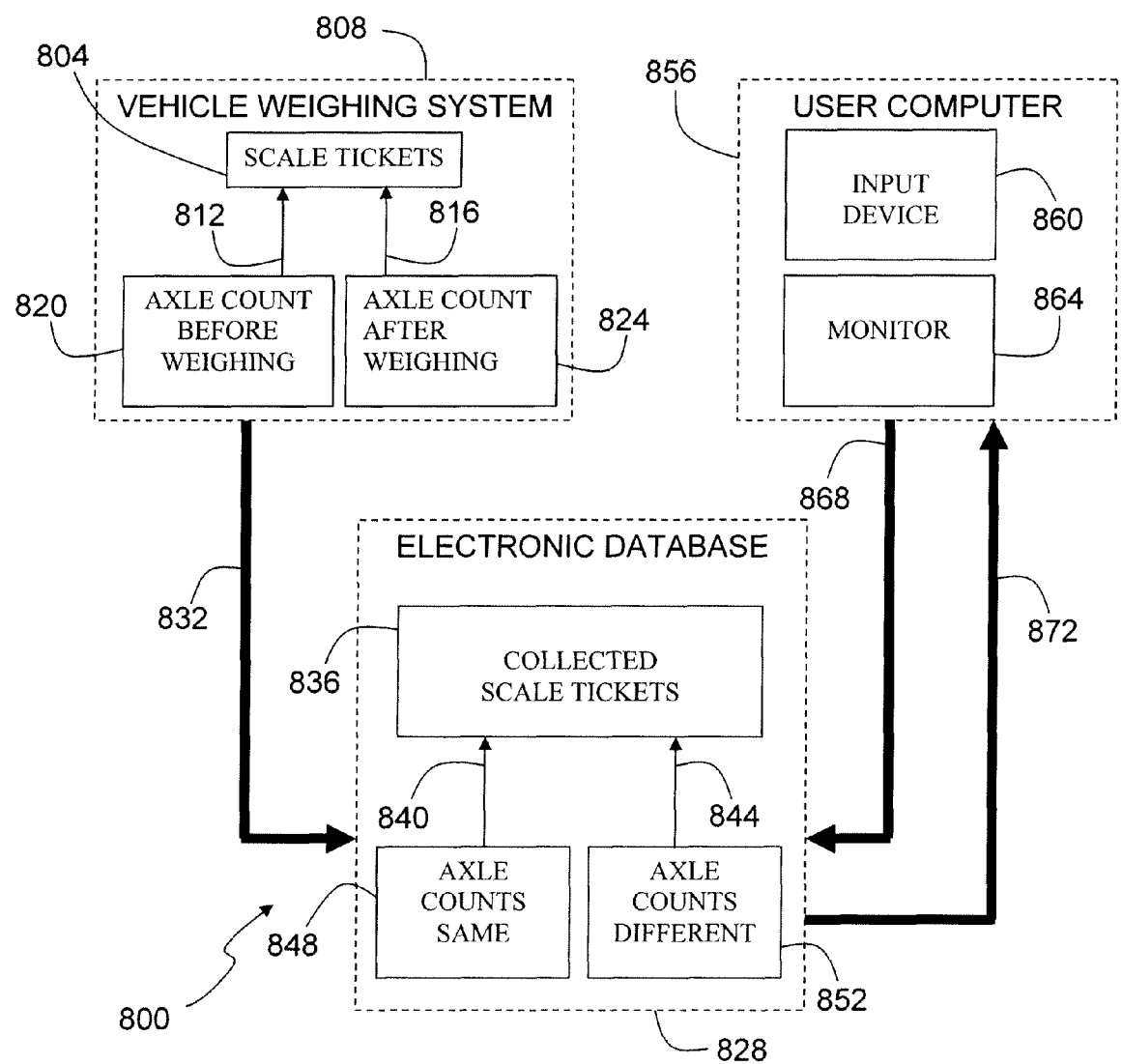
FIG. 8 is a schematic diagram of an embodiment of a scale ticket data system which collects scale tickets generated by the weighing systems shown in FIGS. 1-6, and which may be queried to identify which scale tickets correspond to unloaded vehicles which were (or were not) correctly positioned when weighed.

FIG. 8 is schematic diagram of an embodiment of a scale ticket data system for collecting scale tickets generated by vehicle weighing systems 100, 400, 500, and 600 of FIGS. 1-6. Referring to FIG. 8, the scale ticket data system is indicated generally as 800. System 800 includes Scale Tickets 804 generated by Vehicle Weighing System 808 (which corresponds to vehicle weighing system 100 of FIGS. 1-3). As indicated by respective arrows 812 and 816, each of Scale Tickets 804 at least contains vehicle axle count data which at least includes the vehicle axle count from the first axle counter unit 128 before weighing of unloaded truck 152 (indicated in FIG. 8 as Axle Count Before Weighing 820), as well as the vehicle axle count from the second axle counter unit 132 after weighing of unloaded truck 152 (indicated in FIG. 8 as Axle Count After Weighing 824). Scale Ticket 804 may also contain other data, including, for example, scale ticket number, time of weighing, one or more unique vehicle identifiers (e.g., a vehicle identification number), tare weight measured, purchase order number, etc.

As shown in FIG. 8, system 800 also includes a scale ticket electronic database (indicated in FIG. 8 generally as Electronic Database 828). As indicated by arrow 832, Scale Tickets 804 are transmitted to and collected by Electronic Database 828 as Collected Scale Tickets 836. As indicated by respective arrows 840 and 844, each of these Collected Scale Tickets 836 provides at least vehicle axle count data which is capable of at least identifying Scale Tickets 804 for unloaded and weighed vehicles wherein: (1) the number of Axle Counts Before Weighing 820 and the number of Axle Counts After Weighing 820 are the same (indicated in FIG. 8 as Axle Counts Same data 848), thus indicating Scale Tickets 804 for unloaded trucks 152 which were correctly positioned in weighing area 108 when weighed by scale 104; and (2) the number of Axle Counts Before Weighing 820 and the number of Axle Counts After Weighing 820 are different (indicated in FIG. 8 as Axle Counts Different data 852), thus indicating Scale Tickets 804 for unloaded trucks 152 which were incorrectly positioned within in weighing area 108 when weighed by scale 104.

As shown in FIG. 8, Electronic Database 828 may be accessed (e.g., remotely accessed via the Internet, a LAN, a WAN, etc.), for example, by a User Computer, indicated generally as 856. User Computer 856 may be electronically connected to an Input Device, indicated generally as 860, as well as a Monitor, indicated generally as 864. A request (e.g., query) for Collected Scale Tickets 836 meeting certain criteria may be transmitted, as indicated by arrow 868, from User Computer 856 (which may also be provided with, for example, software for generating such queries and for accessing, e.g., securely accessing, Collected Scale Tickets 836 in Electronic Database 828) to Electronic Database 828. For example, query 868 may request one or more of the following data: (1) Scale Tickets 804 corresponding to unloaded and weighed trucks 152 which are correctly positioned in the vehicle weighing area 108, i.e., those Collected Scale Tickets 836 having Axle Counts Same data 848; or (2) Scale Tickets 804 corresponding to unloaded and weighed trucks 152 which are incorrectly positioned in the vehicle weighing area 108, i.e., those Collected Scale Tickets 836 having Axle Counts Different data 852. The response to query 868 from Electronic Database 828 may then be provided and transmitted (e.g., as a report, such as a crystal report), as indicated by arrow 872, to User Computer 856 for display on Monitor 864, for storage on User Computer 856, for printing out in hard copy form, etc. User Computer 856 may also be provided with special software for providing, displaying, etc., reports 872 (e.g., crystal reports) on Monitor 864, analyzing reports 872, etc.

Figure 9:
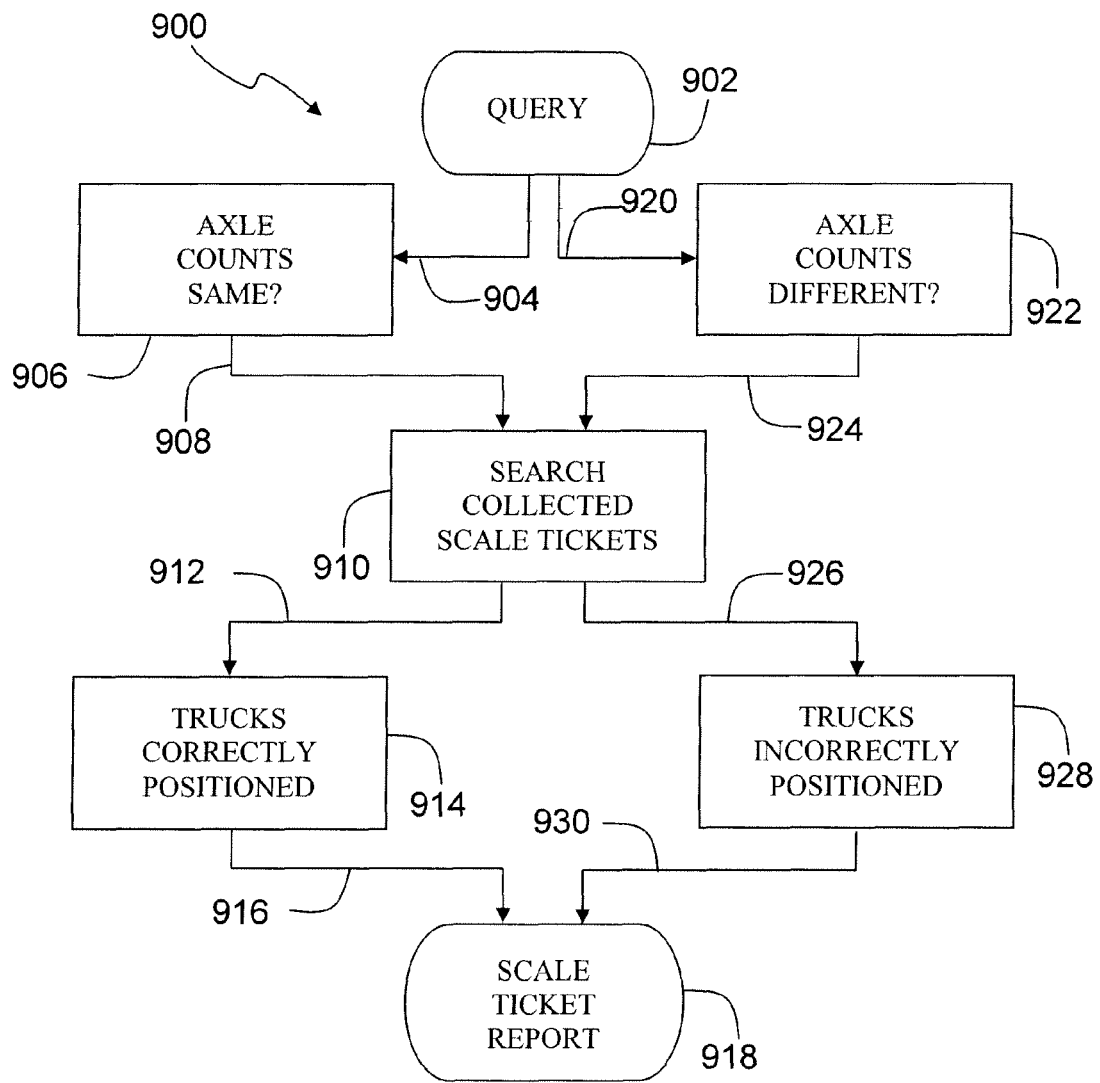
FIG. 9 is a flowchart of an embodiment of a method for querying the electronic database scale ticket data system of FIG. 8 to identify which scale tickets correspond to unloaded vehicles which were (or were not) correctly positioned when weighed.

FIG. 9 is a flowchart which illustrates an embodiment of a method for querying the electronic database scale ticket data system of FIG. 8 to identify which of Collected Scale Tickets 836 correspond to unloaded trucks 152 which were or were not correctly positioned when weighed. This method is indicated in FIG. 9 generally as 900. In method 900, a query (corresponding to query 868 in system 800) is entered by Input Device 860 into User Computer 858 (indicated in FIG. 9 as Query 902). Query 902 may be, for example, a request for one or more of two types of data. As indicated by arrow 904, Query 902 may be a request for all Scale Tickets 804 having Axle Counts Same data 848 (indicated in FIG. 9 as Axle Counts Same? query 906). A search, indicated by arrow 908, may then be made of Collected Scale Tickets 836 in Electronic Database 828 (indicated in FIG. 9 as Search Collected Scale Tickets step 910). After performing Search Collected Scale Tickets step 910, those Scale Tickets 804 having Axle Counts Same data 848, as indicated by arrow 912, may be obtained, thus also indicating all Scale Tickets 804 wherein unloaded trucks 152 are correctly positioned in weighing area 108 (indicated in FIG. 9 as Trucks Correctly Positioned data 914). After obtaining Trucks Correctly Positioned data 914, the data results, as indicated by arrow 916, may be provided as a report to User Computer 858 (indicated in FIG. 9 as Scale Ticket Report 918).

Alternatively (or concurrently), Query 902 may be a request for all Scale Tickets 804 having Axle Counts Different data 852 (indicated in FIG. 9 as Axle Counts Different? query 922). A search, indicated by arrow 924, may then be made of Collected Scale Tickets 836 in Electronic Database 828 (indicated again in FIG. 9 as Search Collected Scale Tickets step 910). After performing Search Collected Scale Tickets step 910, those Scale Tickets 804 having Axle Counts Different data 852, as indicated by arrow 926, are obtained, thus also indicating all Scale Tickets 804 wherein unloaded trucks 152 were incorrectly positioned in weighing area 108 (indicated in FIG. 9 as Trucks Incorrectly Positioned data 928). After obtaining Trucks Incorrectly Positioned data 928, the data results, as indicated by arrow 930, may again be provided as a report to User Computer 858 (again indicated in FIG. 9 as Scale Ticket Report 918).

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method comprising the following steps:
    a. providing a vehicle weighing scale having:
        a vehicle weighing area for weighing an unloaded vehicle having a plurality of vehicle axles, wherein the vehicle weighing area has a vehicle entry edge and a vehicle exit edge;
        a first vehicle axle counter unit which is positioned to count the number of vehicle axles which pass completely over the vehicle entry edge; and
        a second vehicle axle counter unit which is positioned to count the number of vehicle axles which pass completely over the vehicle exit edge; and
    b. activating the first vehicle axle counter unit to count the number of vehicle axles which pass completely over the vehicle entry edge before weighing of the unloaded vehicle;
    c. activating the second vehicle axle counter unit to count the number of vehicle axles which pass completely over the vehicle exit edge after weighing of the unloaded vehicle; and
    d. generating a scale ticket which records the number of vehicle axles counted by the first and second counter units in the vehicle weighing system such that: (i) when the number of vehicle axles counted by the first and second counter units are the same, the unloaded vehicle is correctly positioned in the vehicle weighing area; and (ii) when the number of vehicle axles counted by the first and second counter units are different, the unloaded vehicle is incorrectly positioned in the vehicle weighing area.

2. The method of claim 1, wherein the vehicle weighing area of step (a) comprises a weighing platform.

3. The method of claim 2, wherein the weighing platform of step (a) is generally rectangular.

4. The method of claim 3, wherein the vehicle weighing scale of step (a) comprises a platform scale.

5. The method of claim 3, wherein the vehicle weighing scale of step (a) comprises a pit scale.

6. The method of claim 3, wherein the front edge of the weighing platform of step (a) corresponds to the vehicle entry edge, and wherein the rearward edge of the weighing platform of step (a) corresponds to the vehicle exit edge.

7. The method of claim 1, wherein each of the first and second vehicle axle counter units of step (a) are optical counter units.

8. The method of claim 7, wherein each of the first and second vehicle axle counter units generate an optical beam, wherein the optical beam of the first vehicle axle counter unit of step (a) is at least parallel with the vehicle entry edge, and wherein the optical beam of the second vehicle axle counter unit of step (a) is at least parallel with the vehicle exit edge.

9. The method of claim 8, wherein the optical beam of the first vehicle axle counter unit of step (a) is aligned with the vehicle entry edge, and wherein the optical beam of the second vehicle axle counter unit of step (a) is aligned with the vehicle exit edge.

10. The method of claim 1, wherein each of the first and second vehicle axle counter units of step (a) are mechanical counter units which are positioned to detect the wheels on one or both sides of the unloaded vehicle to thereby count the vehicle axles.

11. The method of claim 10, wherein the mechanical counter units of the first and second vehicle axle counter units of step (a) are positioned to detect wheels during steps (b) and (c) on both sides of the unloaded vehicle to thereby count the vehicle axles.

12. The method of claim 10, wherein the mechanical counter units of the first and second vehicle axle counter units of step (a) are positioned to detect wheels during steps (b) and (c) along one side of the unloaded vehicle to thereby count the vehicle axles.

13. The method of claim 10, wherein the first axle counter unit of step (a) comprises one mechanical counter unit positioned to detect wheels during step (b) on one side of the unloaded vehicle to thereby count the vehicle axles passing completely over the vehicle entry edge, and wherein the second vehicle axle counter unit of step (a) comprises one mechanical counter unit positioned to detect wheels during step (c) on the other side of the unloaded vehicle to thereby count the vehicle axles passing completely over the vehicle exit edge.

14. The method of claim 1, wherein the first and second axle counter units of step (a) count axles of an unloaded truck during steps (b) and (c).

15. The method of claim 14, wherein the unloaded truck comprises a tractor having a plurality of axles and a semi-trailer having a plurality of axles.

16. The method of claim 1, wherein the scale ticket generated by step (d) records the number of truck axles counted by the first and second counter units for an unloaded truck.

17. The method of claim 1, wherein the scale ticket generated by step (d) also records: a scale ticket number; one or more unique identifiers for the unloaded vehicle; and the tare weight measured for the unloaded vehicle by the vehicle weighing scale.

18. The method of claim 1, wherein step (c) is carried out by activating the second axle counter unit after step (b) is carried out and after deactivating the first axle counter unit of step (b).

19. The method of claim 18, wherein step (c) is carried out by activating the second vehicle axle counter unit before weighing of the unloaded vehicle.

20. The method of claim 18, wherein step (c) is carried out by activating the second vehicle axle counter unit during or after weighing of the unloaded vehicle.

21. The method of claim 1, wherein the number of vehicle axles counted by the first counter unit during step (b) is carried out before the scale ticket is generated during step (d), and wherein the number of vehicle axles counted by the second counter unit during step (s) is carried out after the scale ticket is generated during step (d).

* * * * *